(No Model.)
A. HUFFNAGLE.
PHOTOGRAPHIC CAMERA.
No. 257,946. Patented May 16, 1882.
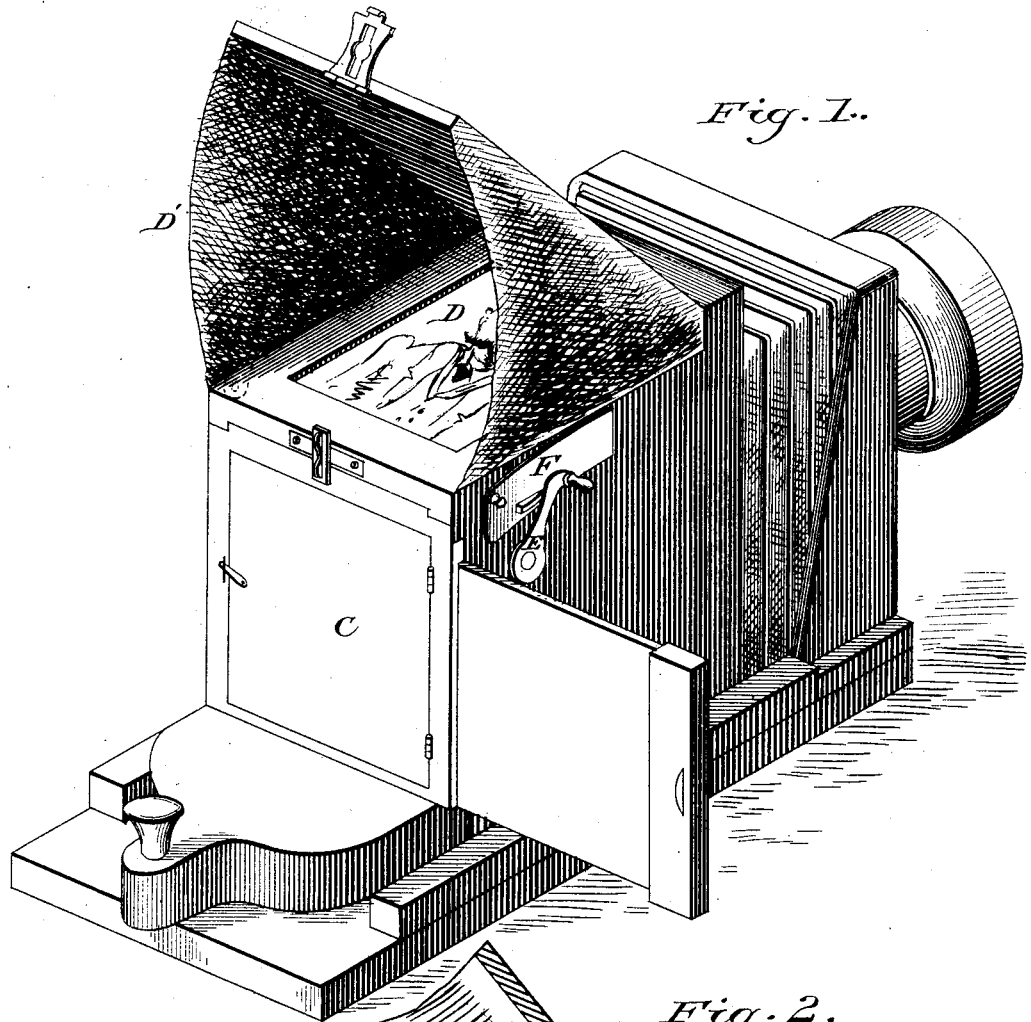
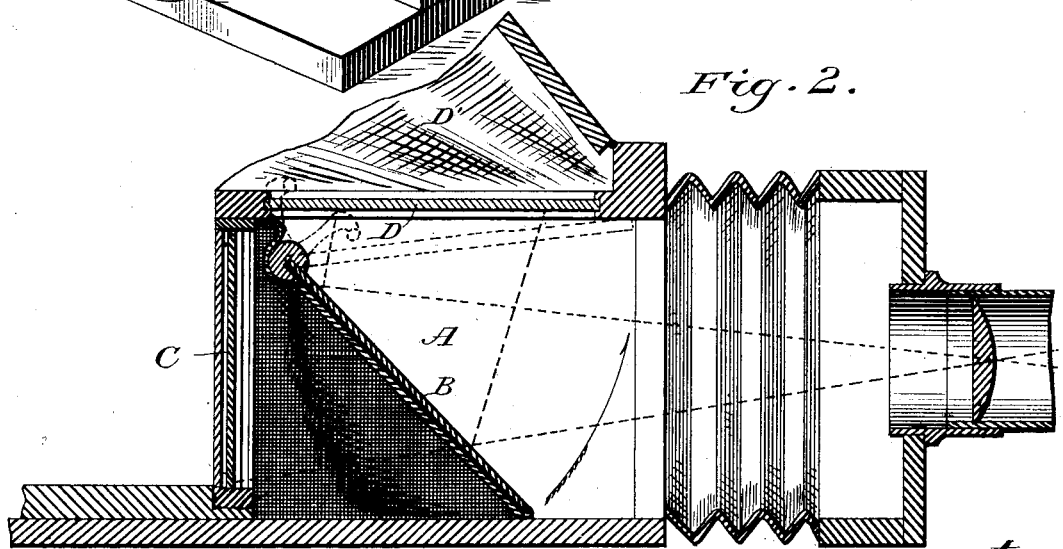

United States Patent Office.

ALFRED HUFFNAGLE, OF PHILADELPHIA, PENNSYLVANIA, ASSIGNOR OF TWO-THIRDS TO JOHN S. B. NAGLE AND WILLIAM F. BACON, BOTH OF SAME PLACE.

PHOTOGRAPHIC CAMERA.

SPECIFICATION forming part of Letters Patent No. 257,946, dated May 16, 1882.

Application filed March 23, 1882. (No model.)

*To all whom it may concern:*

Be it known that I, ALFRED HUFFNAGLE, a citizen of the United States, residing at Philadelphia, in the county of Philadelphia and State of Pennsylvania, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in photographic cameras, whereby the operation of taking pictures, especially of groups and children and by tourists, is simplified and expedited; and the object of the invention is to provide a camera in which the lens cover or cap is dispensed with, and in its stead is employed a dark chamber in which the sensitized plate is arranged while the object is being focused, such chamber being operative when the focus is obtained to instantaneously permit the reception of the image through the lens upon the sensitized plate, whereby loss of time and liability of discomposure of the object are obviated and greater accuracy in obtaining pictures is had; and the invention consists in the construction, combination, and arrangement of parts, all substantially as hereinafter specified and claimed.

In the accompanying drawings, in the two figures of which like parts are similarly designated, Figure 1 is a perspective view of a photographic camera embodying my invention, and Fig. 2 is a longitudinal vertical section thereof.

The body of the camera and its appurtenances may be constructed as usual, except that I dispense with the use of a cap or cover for the lens for obtaining pictures. In the operative end of the camera-box A, next adjacent the plate-holder cavity, is hinged a leaf, B, the side next the lens being provided with a reflector or mirror and its opposite side being made dark. All that portion of the box between the leaf B and the plate-holder C is made dark by the exclusion of light by the leaf, and this darkening of the box and leaf may be intensified by a lining, as of black velvet or other goods, substance, or material not too lustrous, or entirely lusterless. The leaf B will be connected to the sides of the dark chamber thus formed by bagging or flexible material, to permit of the raising and lowering or oscillation upon its hinge of the leaf. The angle of inclination of the mirror on the leaf, or the leaf itself, is such as to throw the image upon the focus-glass D in relatively the same location as the lens would project it upon the sensitized plate in the plate-holder, as indicated by the dotted light lines in Fig. 2. The glass D is protected by a hood, D', from the external light.

The sensitized plate having been put in the plate-holder, and the leaf B being in the position indicated in Fig. 2, so as to complete the dark chamber, the slide may be withdrawn so as to expose the sensitized plate to the dark chamber. The image of the object being reflected upon the glass D and the focus thus obtained, the leaf B is lifted by turning it upon its hinge into the position indicated by dotted lines, Fig. 2. This will shut off the entrance of light from the box through the glass D, and will admit the light directly and instantaneously through the lens on the sensitized plate, so that the focusing and obtaining of the picture are made so nearly synchronously as to greatly expedite photographing restless objects, secure correct pictures, and obviate delays and discomposure of the apparatus or object.

The rapidity and ease of operating with my camera are apparent, and its superiority over the instruments now in use is manifestly very great.

The raising of the leaf B may be readily effected by providing its hinge or axis with a crank-handle, E, on the exterior of the box, such handle being held, when the leaf is raised, by a spring-catch. When the negative is deemed sufficiently strong the leaf is allowed to drop of its gravity by simply depressing the spring-catch. This falling of the leaf gives again the dark chamber by cutting off the light coming in through the lens. The plate-holder slide is then replaced and the plate-holder, with its inclosed plate, removed for the developing of the negative.

The reflection of the object upon the focus-glass is in the upright position, whereby greater accuracy in focusing and in the picture taken is obtained.

What I claim is—

1. A photographic camera provided with a dark chamber to receive the sensitized plate while the object is being focused, combined with a hooded focusing-glass and a reflector to throw the image upon the focusing-glass, and adapted to be operated to admit the light through the lens upon the sensitized plate after the focus is obtained, substantially as shown and described.

2. The combination, with a photographic camera, of a movable reflector connected to the sides of the box by flexible opaque material, and adapted to convert that portion of the camera in which the sensitized plate is arranged into a dark chamber while the focus is being obtained, and to open such chamber to the transmission of light through the lens upon the sensitized plate thereafter, substantially as shown and described.

3. The combination of a camera-box having a focus-glass, a hood thereon, and a leaf hinged in said box and provided with a reflector, whereby the focus is obtained upon said glass, substantially as described.

4. The combination of a focus-glass, a hood thereon, a reflector, and a dark chamber to receive the sensitized plate, whereby the object is focused and the sensitized plate protected from the light during the focusing, with means to cut off the light from and through the focus-glass and direct it through the lens upon the sensitized plate, substantially as described.

5. The combination, substantially as shown and described, of a dark chamber, a leaf therein, and means to hold said leaf in position to admit light into said dark chamber.

In testimony whereof I affix my signature in presence of two witnesses.

ALFRED HUFFNAGLE.

Witnesses:
C. R. WILLIAMS,
F. F. SOWER.